Figure 1:
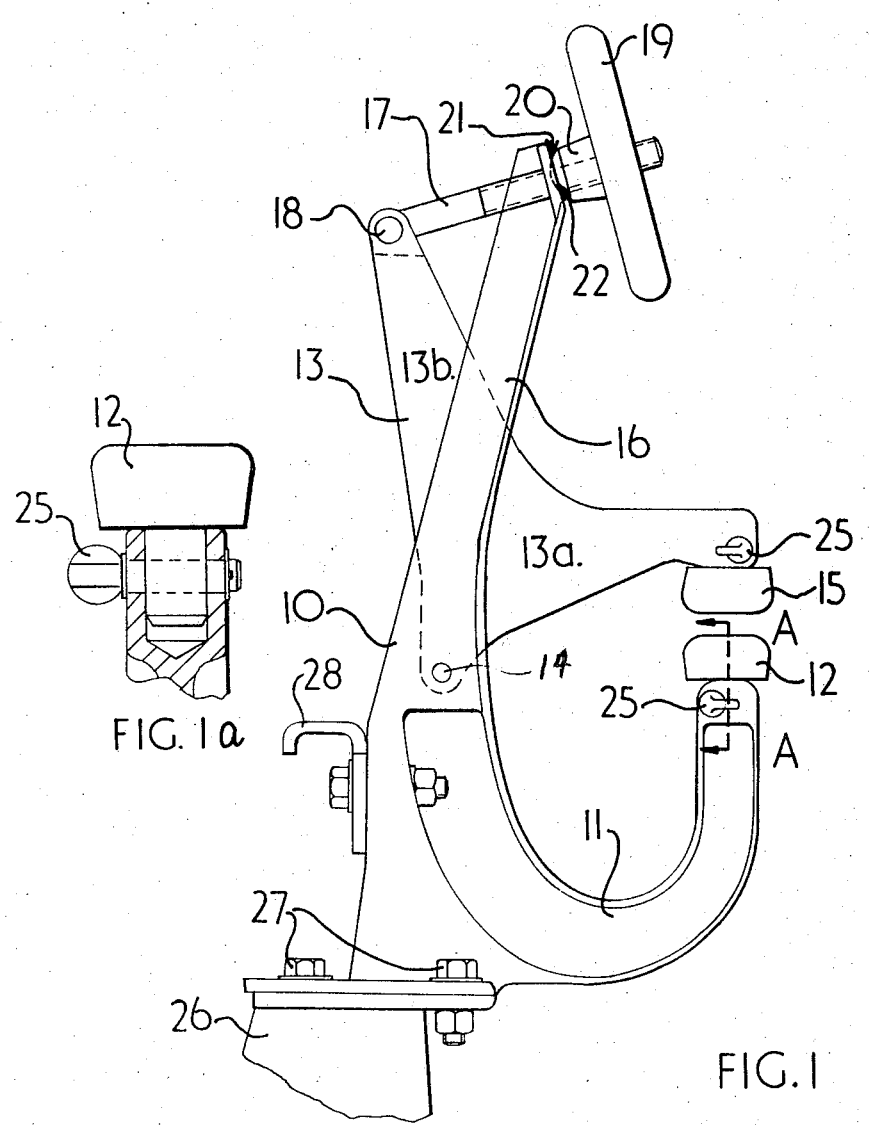

United States Patent
Hogg et al.

[11] 3,850,423
[45] Nov. 26, 1974

[54] TIRE REPAIR DEVICE

[75] Inventors: Derek Hogg, Sutton Coldfield; Roger Anthony Wilson, Cross Lanes; John Fairburn Asakam, Sutton Coldfield, all of England

[73] Assignee: Dunlop Limited, London, England

[22] Filed: Dec. 5, 1972

[21] Appl. No.: 312,324

[30] Foreign Application Priority Data
Dec. 9, 1971 Great Britain.................... 57167/71

[52] U.S. Cl..................... 269/238, 425/12, 425/26, 269/246
[51] Int. Cl............................................. B29h 5/16
[58] Field of Search............. 425/11, 12, 15, 16, 26, 425/27; 269/86, 238, 246

[56] References Cited
UNITED STATES PATENTS

| | | | |
|---|---|---|---|
| 2,668,984 | 2/1954 | Gaschi | 425/11 |
| 2,696,021 | 12/1954 | Cox et al. | 425/26 |
| 2,738,407 | 3/1956 | Dupont | 425/12 |
| 2,808,619 | 10/1957 | Grund | 425/26 |
| 2,814,073 | 11/1957 | Scoyk | 425/27 |
| 2,814,830 | 12/1957 | Leeth | 425/26 |
| 2,827,662 | 3/1958 | Livingston | 425/26 |
| 2,843,877 | 7/1958 | Wolfe | 425/11 |
| 2,889,579 | 6/1959 | Hedge | 425/26 |
| 2,942,296 | 6/1960 | Hewatt | 425/26 |
| 3,172,158 | 3/1965 | Herman et al. | 425/12 |

FOREIGN PATENTS OR APPLICATIONS

| | | | |
|---|---|---|---|
| 453,091 | 12/1948 | Canada | 425/26 |
| 261,877 | 5/1949 | Switzerland | 425/26 |

*Primary Examiner*—J. Howard Flint, Jr.
*Attorney, Agent, or Firm*—Stevens, Davis, Miller & Mosher

[57] ABSTRACT

A tire repair vulcanizing device comprising two jaws in the form of heating pads for gripping that part of the tire in need of repair. Means for urging the jaws together to apply pressure to the tire are provided separately from the means for opening and closing the jaws to allow the tire to be located in position. The device is of compact form and does not distort the tire when in position wherever the repair is required.

8 Claims, 4 Drawing Figures

TIRE REPAIR DEVICE

This invention relates to tire repair devices particularly devices wherein rubber adjacent to a damaged area, a fault or other blemish has to be vulcanised.

In accordance with the invention a tire repair device comprises two frame members connected by a support member, two jaws one on each of the frame members, means for relatively urging the jaws together to apply pressure to a portion of a tire located for repair between the jaws and moving means separate from the urging means for moving the frame members relatively to one another to facilitate insertion and removal of portion of a tire which is in need of repair between said jaws, the size and shape of at least one jaw and associated frame member being such that the tire may be freely positioned with said jaw inside the tire and the two jaws may be moved together to sandwich between them that portion of the tire in need of repair, which portion may be located anywhere on the tire.

The device may be of such size and shape that when in use with a tire on the device with that portion of the tire in need of repair between the jaws, the device allows the tire to encircle the device with no part of the device e.g. the means for urging the jaws together, interfering with the tire to cause any distortion thereof.

The moving means may be capable of relatively moving the frame members in a direction other than that for applying pressure to the tire.

The means for relatively urging the jaws together may comprise screw means and the moving means may comprise sliding means or rotatable means.

Preferably the or each jaw comprises a heating pad including heating means for vulcanising the tire in the vicinity of the repair, which means may comprise resistance wires for electrical heating. The or each heating pad may be detachably securable to one of the frame members; a range of interchangeable heating pads may be provided to suit different sizes or types of tires or repairs to different portions, e.g., tread and sidewalls of tires.

Auxiliary locating means may be provided for supporting the tire in position during repair.

In one form of the device, both jaws are of similar size and are capable of being inserted inside the tire but the shape of the associated frame members is such that when effecting a repair in the tread region of the tire only one jaw is capable of being inserted inside the tire without any part of the device distorting the tire but when effecting a repair in a sidewall region of the tire the other jaw is capable of being inserted inside the tire without any part of the device distorting the tire.

In a second form of the device one jaw and associated frame member is capable of being inserted inside the tire without any part of the device distorting the tire to effect a repair in any part of the tire, i.e., in the tread region and the sidewall regions.

Figure 2:
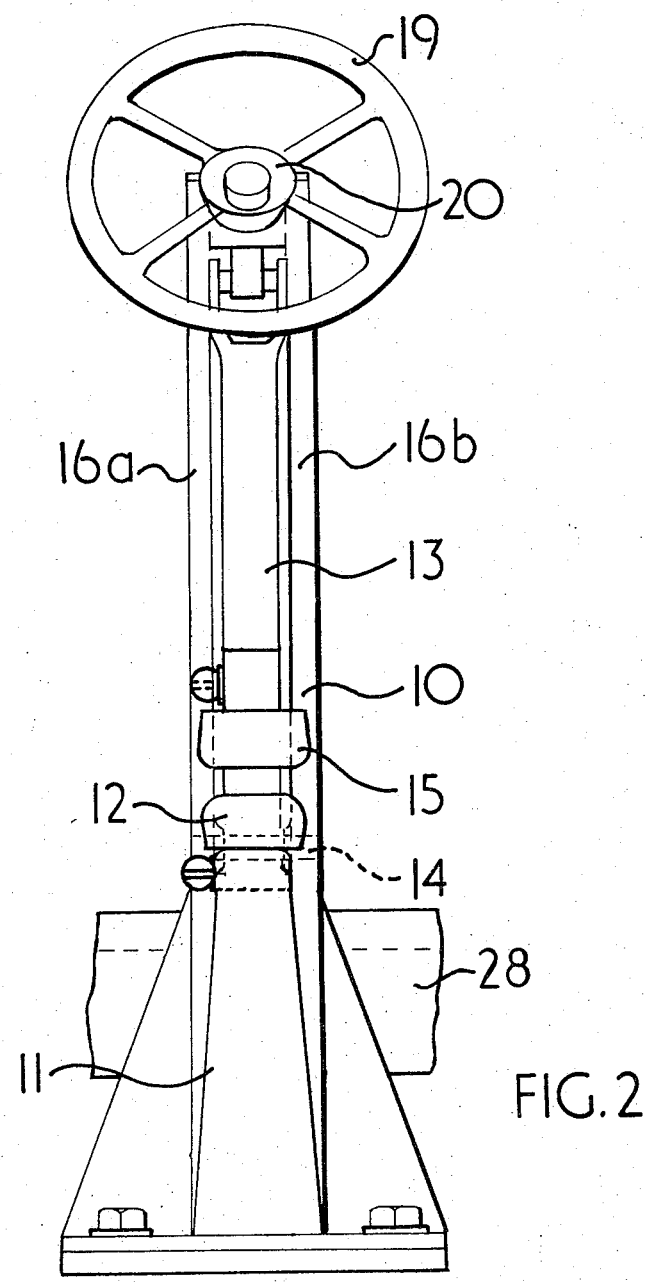
Figure 3:
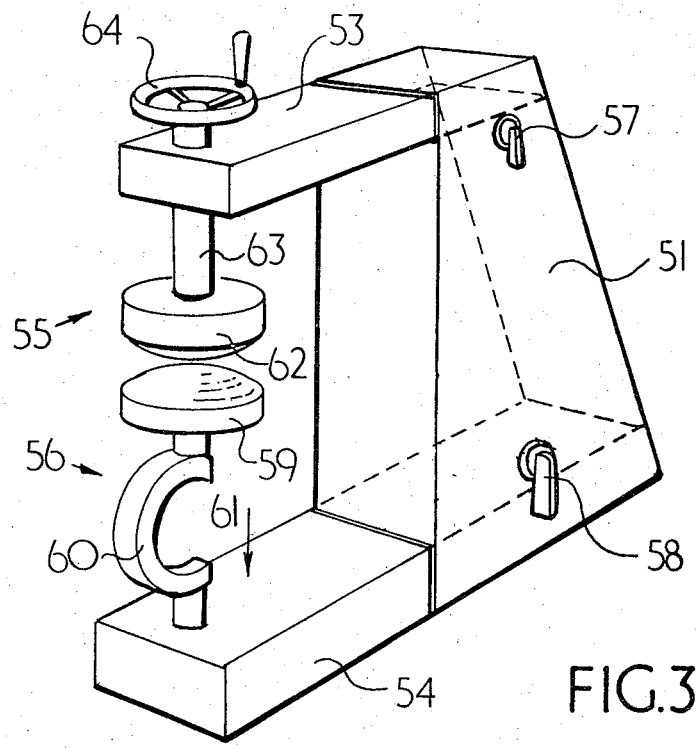
Figure 4:
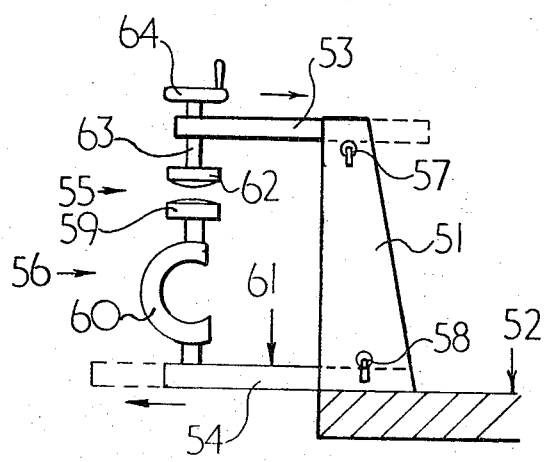

Two tire repair devices in accordance with the invention and both capable of repairing tires of bead diameters 10 inch and greater will now be described by way of example with reference to the accompanying drawings of which:

FIG. 1 is a side view of the first repair device in accordance with the invention, FIG. 1a is a sectional view on the line A—A of FIG. 1, FIG. 2 is a front view of the device shown in FIG. 1, FIG. 3 is a perspective view of the second device according to the invention, FIG. 4 is a side view of the device shown in FIG. 3.

The first device, illustrated in FIGS. 1, 1a and 2 comprises an upright support member 10, a lower frame member 11 in the form of a cantilever integrally formed with the support member 10 and carrying a lower jaw in the form of a heating pad 12. An upper frame member 13 in the shape of a bell crank is connected by a pivot 14 to the support member 10 so as to be capable of rotating about a horizontal axis and carries an upper jaw in the form of a second heating pad 15.

The support member 10 is adapted to be secured to a bench top 26 or stand by bolts 27. From the side view it has the shape of a letter 'J' the top of the longer side 16 being approximately three times higher than the other with respect to the top of the bench or stand. This longer side is divided into two parallel halves 16a and 16b, the upper frame member 13 being pivoted between these two halves on the pivot 14 provided at the base of the halves so as to rotate in the same general plane as the support member 10 and the lower jaw 12.

The upper frame member 13 comprises two limbs 13a and 13b extending approximately at right angles to one another. It is pivotally attached to the support member 10 between the two halves by means of the pivot 14 located at the junction of the two limbs 13a and 13b.

One of these limbs, 13a, carries the upper jaw 15 at its end, while at the end of the other limb, 13b, is attached a short screw-threaded shaft 17 by means of a second pivot 18 enabling the shaft to rotate about a horizontal axis in the same general plane as the remainder of the device. The shaft 17 carries a wheel/handle 19 attached to a boss 20, which is internally screw-threaded so as to be capable of moving along the shaft on rotation. The boss has a diameter which is greater than the gap between the two halves 16a and 16b of the support member and is formed with a part-spherical surface 21 at one end which is capable of seating in a complementary cup-shaped recess 22 on the upper extremity of the support member.

The relative positions, shape and dimensions of the longer side 16 of the support member 10, the limb 13b of the upper frame member 13, the shaft 17 and the handle 19 with respect to one another and to the jaws allows a tire to be freely positioned on the device, no part thereof interfering with the tire and causing distortion thereof other than the jaws themselves to that part of the tire in need of repair.

The two heating pads 12 and 15 are formed with short lugs 23 which seat in recesses 24, one on the end of the upper frame member and the other on the end of the lower frame member. The pads can be locked in position by quick release locking means 25.

In operation the upper frame member 13 is initially pivotally tilted backwards so that the upper heating pad 15 is located some distance from the lower pad 12 so that there is ample room for a tire in need of a repair in the tread region thereof to be positioned with the lower heating pad 12 inside the tire which hangs down below the device. The upper heating pad 15 is then lowered towards the tire and the lower pad by tilting the upper frame member 13 forwards until the upper pad comes into contact with the tire, which is then positioned between the two pads. The operator can steady the tire in position with one hand while with the other can swing the shaft 17 on the upper frame member 13 forwards between the two halves 16a and 16b and rotate the handle 19 until the part-spherical boss surface 21 is firmly engaged in its seating recess 22. The operator can then release his hold on the tire and further pressure can be applied to the upper pad to grip the tire between the two pads 12 and 15 by further rotation of the handle 19.

After repairing the tire by applying heat to one or both pads the tire can be quickly removed by means of a few reverse turns of the handle 19 to release the boss 20 from the recess 22 and swinging the shaft 17 and upper frame member 13 upwards and rearwards.

To effect a repair in the sidewall of the tire the upper heating pad 15 is lowered so that the limb 13a of the upper frame member 13 is approximately horizontal. The tire is positioned so as to encircle the device in approximately a horizontal plane and may at least be partially supported by the bar 28.

When the tire is in position the upper pad 15 is lowered towards the lower pad 12 until the external surface of the tire sidewall comes into contact with the lower pad 12. The operator can steady the tire in position with one hand while with the other can swing the shaft 17 forwards and rotate the handle 19 as described above.

The second embodiment of the invention illustrated in FIGS. 3 and 4 comprises a vertical support member 51 secured to a bench top 52 or stand, two parallel horizontal frame members, an upper 53 and a lower 54, to each of which are attached jaws 55 and 56.

Two rectangular holes are formed in the support member 51 one near the top and the other nearer the bottom. The two frame members 53 and 54 of rectangular section tubing are slidably located one in each of these holes. Locking means 57 and 58 are provided to secure each frame member in a required position in its hole.

The lower jaw 56 comprises a heating pad 59 secured on the top of a stem 60 located on the top surface 61 of the lower frame member 54. The stem 60 is curved into semi-circular form and may be secured to the lower frame member so as to rotate about a vertical axis.

The upper jaw 55 comprises a heating pad 62 secured to the lower end of a screw-threaded vertical shaft 63 located in a threaded hole in the upper frame member 53. The upper end of the shaft which extends above the upper frame member is provided with a handle 64 by means of which the shaft may be rotated thus causing the heating pad to be raised or lowered depending on the direction of rotation of the shaft 63.

In use of the apparatus the lower frame member 54 is slid forward so that the lower jaw 56 is moved clear of the support member and the frame member then locked in position. The upper frame member 53 is slid back so that the upper jaw 55 is closely adjacent the support member 51. The tire is then positioned with the lower heating pad 59 inside it. If the repair is to be made on a sidewall the tire is positioned approximately horizontally with the bead on the other side of the tire disposed in the area partly bounded by the semi-circular stem 60. The tire may encircle the support member 51 and be supported by the bench top 52, and in this instance the stem 60 is rotated so that the curved part thereof is closest to the support member 51. If the repair is in the tread the tire is hung vertically on the lower jaw and heating pad and the stem 60 is rotated so that the curved part is in the plane of the tire.

While steadying the tire in position with one hand the operator then slides the upper frame member 53 forwards so that the upper jaw 55 opposed to the lower jaw 56, locks the upper frame member in position and turns the handle 64 to lower the upper jaw into contact with the tire. The operator can then release his hold on the tire and turn the handle further to apply pressure to the tire.

After repairing the tire by applying heat to one or both pads the tire can be quickly removed by making a few turns of the handle 64 to raise the upper pad away from the tire, unlocking the upper frame member and sliding it backwards towards the support member.

In modifications of the second embodiment just described, one of the two frame members may be secured rigidly to the support member, or instead of or in addition to the upper frame member being slidable in respect to the support member, the upper frame member may be pivotally attached to the support member either about a horizontal axis, similar to the first embodiment, or about a vertical axis so that the upper jaw can be swung to one side of the support member.

The advantages of the devices of the invention are that an operator can position the tire accurately on the lower jaw without the upper jaw being in the operator's line of vision between his eyes and the region of the tire to be repaired in position on the lower jaw and secondly, once the tire has been accurately positioned the upper jaw can quickly and easily be moved into position and pressure applied to the tire between the two jaws.

Having now described our invention, what we claim is:

1. A tire repair device comprising a support member having an upwardly extending portion, an upper frame member pivotally connected to the support member to rotate about a horizontal axis, a lower frame member in the form of a cantilever rigidly connected to the support member, an upper jaw on the upper frame member, a lower jaw on the lower frame member, the size and configuration of at least one jaw and associated frame member being such that a tire may be freely positioned with said jaw inside the tire, the upper jaw being capable of being moved downwards towards the lower jaw on pivoting of the upper frame member with respect to the support member to sandwich between the jaws that portion of a tire which is in need of repair, which portion may be located anywhere in the tire, a screw threaded shaft pivotally connected to the upper frame member, a hand wheel carried on the shaft, the shaft being capable of being pivoted about a horizontal axis from an open position to a closing position where it is substantially horizontal and the hand wheel engages the upwardly extending portion of the support member whereby rotation of the hand wheel causes the upper frame member to rotate with respect to the support member and the upper jaw to be urged downwards towards the lower jaw.

2. A tire repair device according to claim 1 wherein at least one jaw is detachably securable to a frame member.

3. A tire repair device according to claim 1 comprising locating means for supporting the tire in position during repair.

4. A tire repair device according to claim 1 wherein both jaws are capable of being inserted inside the tire but the shape of the associated frame members is such that when effecting a repair in the tread region of the tire only one jaw is capable of being inserted inside the tire without any part of the device distorting the tire but when effecting a repair in a sidewall region of the tire the other jaw is capable of being inserted inside the tire without any part of the device distorting the tire.

5. A tire repair device according to claim 1 wherein one jaw and associated frame member is capable of being inserted inside the tire without any part of the device distorting the tire to effect a repair in any part of the tire.

6. A tire repair device according to claim 1 wherein the hand wheel is positioned above the upper jaw when the hand wheel is in engagement with the upwardly extending portion of the support member.

7. A tire repair device for gripping any portion of a tire between a pair of upper and lower jaws comprising:

a. a vertically extending support member having the lower jaw on an outwardly extending lower leg;
b. a horizontal pivot pin on the mid portion of the support member, said pin having a bell crank pivotally mounted thereon for movement in a vertical plane;
c. the upper jaw mounted on one end of the bell crank for movement toward and away from the lower jaw upon pivoting of the bell crank;
d. a screw threaded shaft and hand wheel, said shaft being connected to the bell crank for movement of the bell crank in a vertical plane between a nonclamping position and clamping position in which the shaft extends substantially horizontally;
e. means at the top of the support member to receive the handwheel and adjacent shaft when in the clamping position so that upon tightening of the hand wheel the upper jaw is urged downwardly toward the lower jaw.

8. A tire repair device according to claim 7 wherein the vertically extending support member is "J" shaped with said lower jaw on its shorter leg.

* * * * *

UNITED STATES PATENT OFFICE
CERTIFICATE OF CORRECTION

Patent No. 3850423            Dated November 26, 1974

Inventor(s) Derek Hogg, Roger Anthony Wilson, John Fairburn Askam.

It is certified that error appears in the above-identified patent and that said Letters Patent are hereby corrected as shown below:

On the front page, under code [75], line 3, change inventor's last name from "Asakam" to read --Askam--.

Signed and sealed this 11th day of February 1975.

(SEAL)
Attest:

RUTH C. MASON
Attesting Officer

C. MARSHALL DANN
Commissioner of Patents
and Trademarks